March 12, 1963 D. A. NODES 3,080,717
HEAT ENGINE

Filed June 7, 1961 3 Sheets-Sheet 1

INVENTOR.
DAVID A. NODES
BY
Schmieding and Fultz
HIS ATTORNEYS

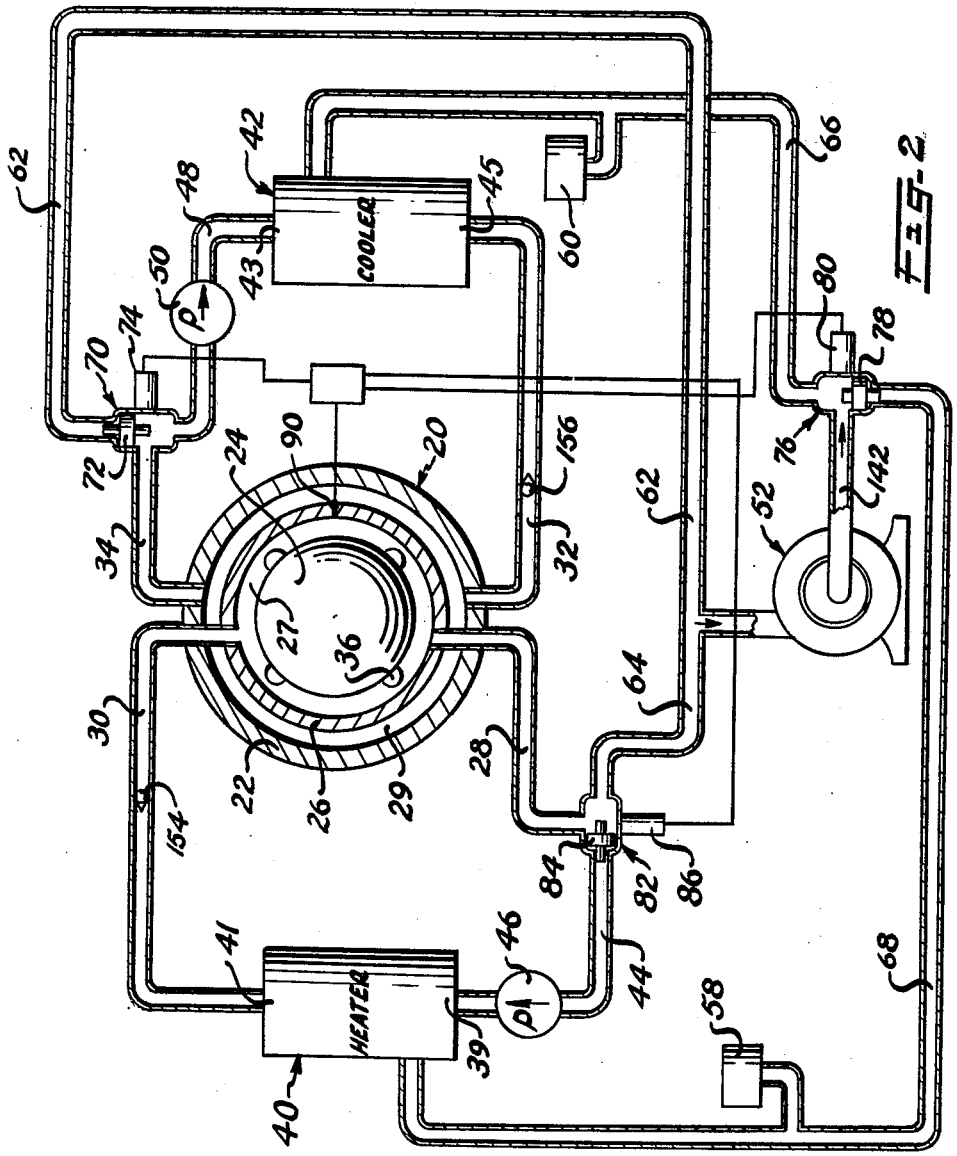

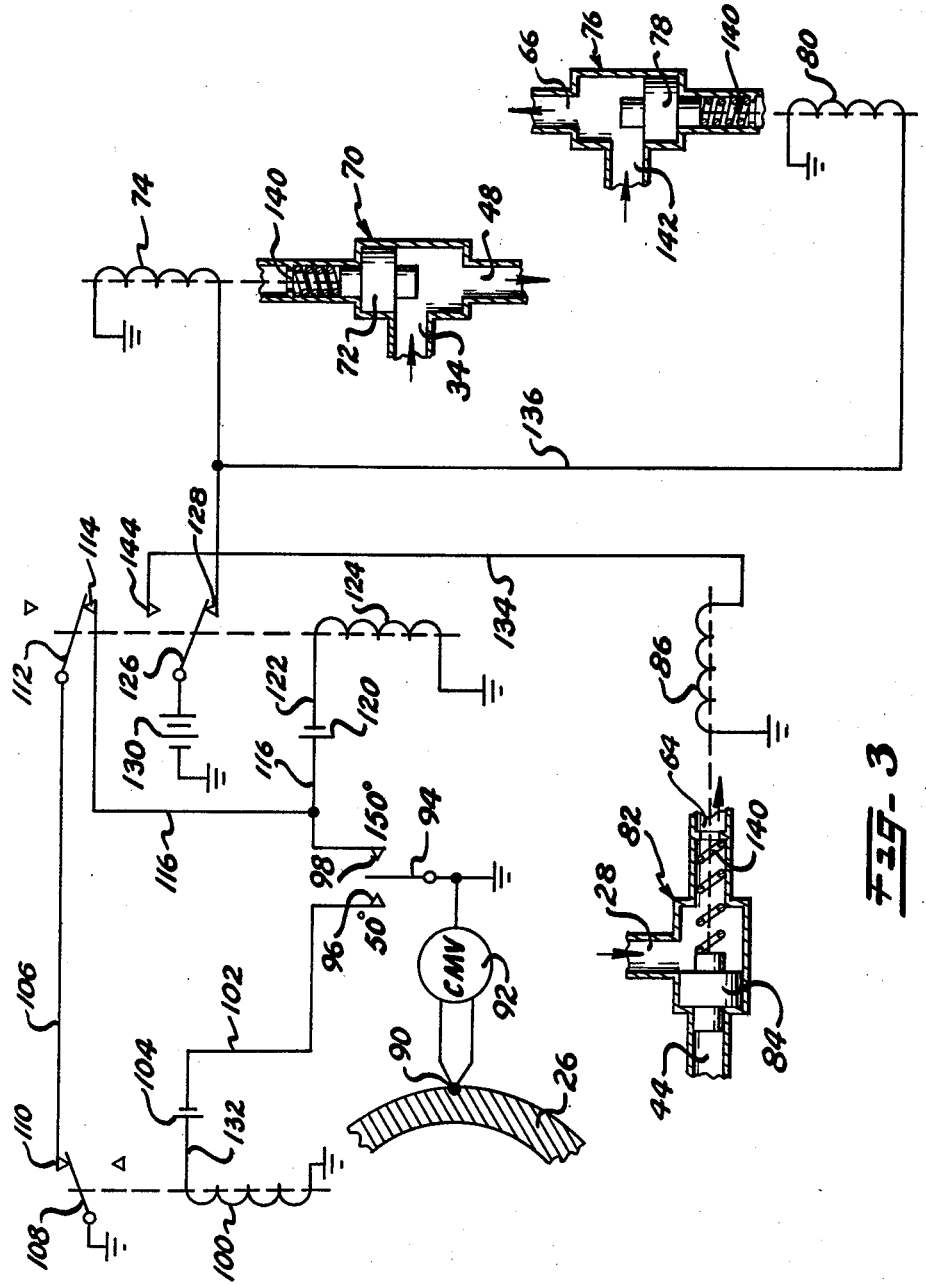

United States Patent Office 3,080,717
Patented Mar. 12, 1963

3,080,717
HEAT ENGINE
David A. Nodes, 406 Ottawa Ave., Westerville, Ohio
Filed June 7, 1961, Ser. No. 115,417
10 Claims. (Cl. 60—51)

This invention relates to heat engines and particularly to an apparatus that utilizes the transfer of heat from hot and cold fluid to an expandable and contractable chamber wall to expel fluid to a fluid motor.

In general the apparatus of the present invention includes a flexible metal shell in spaced surrounding relationship with a rigid inner core, said shell being surrounded by a rigid housing spaced outwardly from the shell.

The shell and core form an inner chamber and the shell and housing form an outer chamber, said inner chamber being connected with a source of hot fluid and said outer chamber being connected with a source of cold fluid.

When heated fluid is delivered from the hot source to the inner chamber, at zero pressure, the shell expands and expels fluid from the outer chamber to a fluid motor. After the previously mentioned shell has expanded and become heated to a predetermined hot temperature the cold cycle begins and cold fluid is delivered from the cold source to the outer chamber whereby the shell contracts and cools to a predetermined cold temperature and in so doing expels fluid from the inner chamber of the fluid motor.

When the shell cools to the predetermined cold temperature the cold cycle terminates and the previously described hot cycle is repeated.

It is therefore an object of the present invention to provide a heat engine of novel construction that includes a thermally expandable and contractable shell disposed in spaced relationship with a rigid inner core and a rigid outer housing to form inner and outer chambers, said chambers being arranged to alternately deliver pressurized fluid to a fluid motor.

It is another object of the present invention to provide a heat engine of the type described that includes a novel control apparatus for automatically alternating connecting and disconnecting pumping chambers with heaters and coolers.

It is another object of the present invention to provide a heat engine of the type described that includes a heater and cooler for delivering hot and cold fluids to chambers of the engine, means for delivering pressurized fluid from the chambers to a fluid motor, and conduit means for alternately returning fluid from the fluid motor to the heater and cooler.

Further objects and advantages of the present invention will be apparent from the following description, reference being had to accompanying drawings wherein a preferred form of embodiment of the invention is clearly shown.

In the drawings:

FIG. 2 is a diagrammatic view of the heat engine of FIG. 1 and a control apparatus therefore; and FIG. 3 is a diagrammatic view of an electrical system comprising a portion of the control apparatus of FIG. 2.

Figure 1:
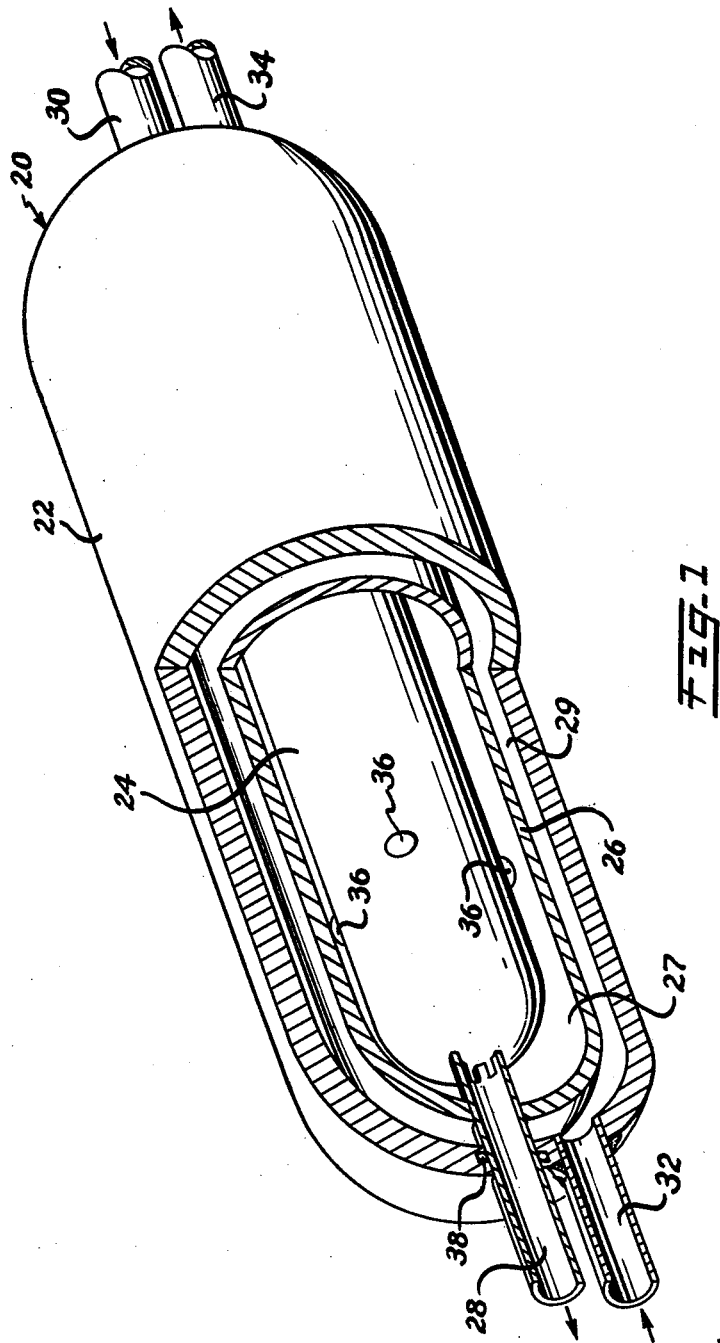
FIG. 1 is a perspective view, partially in section, of a heat engine constructed in accordance with the present invention.

Referring in detail to the drawings, FIG. 1 illustrates a heat engine constructed in accordance with the present invention and indicated generally at 20.

The engine includes an expandable and contractable shell 26 in space surrounding relationship with an inner core 24 to form an inner chamber 27. Shell 26 is in turn surrounded by a rigid housing 22 and is spaced from it to form an outer chamber 29.

Rigid inner core 24 is provided with a plurality of radially extending protrusions 36 for substantially centering core 24 within shell 26.

With reference to FIGS. 1 and 2 inner chamber 27 receives hot fluid from a heater indicated generally at 40 via check valve 154 and an intake conduit 30 and fluid is returned to the heater via conduit 28, valve 82, conduit 44, and fluid translating means or pump 46 connected to the cold end 39 of heater 40.

During the cold cycle outer chamber 29 receives colder fluid from the cold end 45 of a cooler indicated generally at 42 via check valve 156 and conduit 32. Fluid is returned to the hot end 43 of the cooler via conduit 34, valve 70, fluid translating means or pump 50, and conduit 48.

The apparatus of FIG. 2 further includes a fluid motor 52 which during the hot cycle of the engine receives pressurized fluid from the contracting outer chamber 29 via conduit 34, valve 70, and conduit 62.

During the cold cycle fluid is delivered from the contracting inner chamber 27 to fluid motor 52 via conduit 28, valve 82, and conduit 64. The fluid leaving fluid motor 52 is returned to the hot end of cooler 42 via conduit 142, valve 76, and conduit 66.

During the hot cycle fluid is delivered from outer chamber 29 via conduit 34, valve 70, and conduit 62. Fluid released from motor 52 is returned to the cold side 39 of heater 40 via conduit 112, valve 76, and conduit 68.

Each of the return conduits 66 and 68 is provided with a respective accumulator 60 and 58 of the conventional type wherein a chamber encloses a compressible gas disposed above the liquid level.

With reference to FIGS. 2 and 3, the system further includes a thermally responsive control apparatus for alternately starting and terminating the previously described hot and cold cycles.

As seen in FIG. 3, thermally responsive switch 92 includes a thermocouple 90 in contact with contractable and expandable shell 26 and a movable contact 94 that progressively moves between stationary contacts 96 and 98 when the temperature of the inner shell moves through a predetermined range, say from 50° F. to 150° F. The movable contact 94 of the switch returns from stationary contact 98 to stationary contact 96 when the temperatures of shell 26 cools through the preselected temperature range.

With continued reference to FIG. 3, valves 70, 76, and 82 are shown disposed in the cold cycle configuration and movable contact 94 of thermal switch 92 as departed from the 150° contact 98 and is progressing towards the 50° contact 96.

When movable contact 94 engaged contact 98 at the beginning of the cold cycle, relay 124 was energized via wire 122, battery 120, wire 116, stationary contact 98, and movable contact 94. After movable contact 94 breaks with stationary contact 98 relay 124 is maintained energized by movable contact 108, stationary contact 110, wire 106, movable contact 112, stationary contact 114, wire 116, battery 120, and wire 122.

When relay 124 is energized contact 126 bridges contact 128 and energizes the solenoid 74 of a cold flow control valve 70 via battery 130, movable contact 126, stationary contact 128, and wire 136. This shifts a valve element 72 to the top position, seen in FIG. 3, against the action of a spring 140, and conduit 34 is connected to conduit 48. As seen in FIG. 2, this permits pump 50 to circulate colder fluid through outer chamber 29 of the engine.

When relay 124 is energized it serves the additional function of breaking contact between stationary contact 144 and movable contact 126. This deenergizes the solenoid 86 of a hot flow control valve 82 whereby spring 140 shifts valve element 84 to the left position as seen in FIG. 3 wherein the valve element isolates conduit 44 from conduit 28 and connects conduit 28 with fluid motor 52 via conduit 64. At this point of the drawings, it will be understood that when element 72 of valve 70 is lifted and element 84 of valve 82 is shifted to the left colder fluid begins to circulate through outer chamber 29 and hoter fluid from inner chamber 27 is free to flow to fluid motor 52.

Energization of relay 124 at the outset of the cold cycle serves the additional function of energizing solenoid 80 of a return flow control valve 76 via battery 130, movable contact 126, stationary contact 128, and wire 136. This sends the fluid from fluid motor 52 back to the hot end of cooler 42.

At the termination of the cold cycle, relay 100 is energized via wire 132, battery 104, wire 102, stationary contact 96, and movable contact 94. This causes the armature of relay 100 to break contact between movable contact 108 and stationary contact 110 whereby the coil of relay 124 is deenergized and its armature moves upwardly and breaks contact between contacts 112 and 114 and contacts 126 and 128. At the same time, the armature of relay 124 bridges contacts 126 and 144 and energizes relay 86 via battery 130, movable contact 126, stationary contact 144, and wire 134.

This deenergization of relay 124 and deenergization of solenoid 74 serves to shift valve element 72 of cold flow control valve 70 downwardly under the action of spring 140. It also serves to shift element 78 of return flow control valve 76 upwardly under the action of spring 140. Since solenoid 86 was energized, valve element 84 of valve 82 is shifted to the right against the action of its spring 140.

The above described shifting of the valves at the termination of the cold cycle and the beginning of the hot cycle starts the circulation of hot fluid from the hot end 41 of heater 40 through inner chamber 27 and then back to the cold end 39 of the heater. The shifted valves connect outer chamber 29 with fluid motor 52 via conduit 34, valve 70, and conduit 62.

A third function is accomplished by the shifting of the valves to the hot cycle position in that fluid return valve 76 connects the outlet of fluid motor 52 with the cold end of heater 40 via conduit 142, valve 76, and conduit 68.

The termination of the hot cycle and beginning of the cold cycle are effected by the increase in temperatures of shell 26 to 150°. At this temperature thermal switch 92 bridges movable contact 94 and stationary contact 98 and again energizes relay 124.

While the form of embodiment of the present invention as herein disclosed constitutes a preferred form, it is to be understood that other forms might be adopted all coming within the scope of the claims which follow.

I claim:

1. A heat engine comprising, in combination, a rigid core member; a flexible thermally expandable and contractable shell in spaced surrounding relationship with said core member and forming therewith an inner chamber; a rigid housing in spaced surrounding relationship with said shell and forming therewith an outer chamber; inner inlet and outlet conduits for said inner chamber; outer inlet and outlet conduits for said outer chamber; a first passage means including a first heat exchanger connected between said inner inlet conduit and said inner outlet conduit; a second passage means including a second heat exchanger connected between said outer inlet conduit and said outer outlet conduit; a first fluid translating means for circulating fluid through said first passage means; and a second fluid translating means for circulating fluid through said second passage means.

2. A heat engine comprising, in combination, a rigid core member; a flexible thermally expandable and contractable shell in spaced surrounding relationship with said core member and forming therewith an inner chamber; a rigid housing in spaced surrounding relationship with said shell and forming therewith an outer chamber; inner inlet and outlet conduits for said inner chamber; outer inlet and outlet conduits for said outer chamber; a heater including a cold end connected to one of said outlet conduits and a hot end connected to the corresponding inlet conduit; a cooler including a hot end connected to the other of said outlet conduits and a cold end connected to the corresponding inlet conduit; and fluid translating means for recirculating fluid from said outlet conduits back through said heaters and coolers.

3. A heat engine comprising, in combination, a rigid core member; a flexible thermally expandable and contractable shell in spaced surrounding relationship with said core member and forming therewith an inner chamber; a rigid housing in spaced surrounding relationship with said shell and forming therewith an outer chamber; inner inlet and outlet conduits for said inner chamber; outer inlet and outlet conduits for said outer chamber; a first heat exchanger connected between said inner conduit and said inner outlet conduit; a second heat exchanger connected between said outer inlet conduit and said outer outlet conduit; a fluid motor including an inlet and outlet; a first passage means connecting said inner chamber with said inlet of said fluid motor; a second passage means connecting said outer chamber with said inlet of said fluid motor; a first valve means for selectively connecting said inner chamber with said first heat exchanger or said inlet of said fluid motor; and a second valve means for selectively connecting said outer chamber with said second heat exchanger or said inlet of said fluid motor.

4. A heat engine comprising, in combination, a rigid core member; a flexible thermally expandable and contractable shell in spaced surrounding relationship with said core member and forming therewith an inner chamber; a rigid housing in spaced surrounding relationship with said shell and forming therewith an outer chamber; inner inlet and outlet conduits for said inner chamber; outer inlet and outlet conduits for said outer chamber; a first heat exchanger connected between said inner inlet conduit and said inner outlet conduit; a second heat exchanger connected between said outer inlet conduit and said outer outlet conduit; a fluid motor including an inlet and outlet; a first passage means connecting said inner chamber with said inlet of said fluid motor; a second passage means connecting said outer chamber with said inlet of said fluid motor; a first valve means for selectively connecting said inner chamber with said first heat exchanger or said inlet of said fluid motor; a second valve means for selectively connecting said outer chamber with said second heat exchanger or said inlet of said fluid motor; and a third passage means connecting said outlet of said fluid motor with said heat exchangers.

5. A heat engine comprising, in combination, a rigid core member; a flexible thermally expandable and contractable shell in spaced surrounding relationship with said core member and forming therewith an inner chamber; a rigid housing in spaced surrounding relationship with said shell and forming therewith an outer chamber; inner inlet and outlet conduits for said inner chamber; outer inlet and outlet conduits for said outer chamber; a first heat exchanger connected between said inner conduit and said inner outlet conduit; a second heat exchanger connected between said outer inlet conduit and said outer outlet conduit; a fluid motor including an inlet and outlet; a first passage means connecting said inner chamber with said inlet of said fluid motor; a second passage means connecting said outer chamber with said inlet of said fluid motor; a first valve means for selectively connecting said inner chamber with said first heat exchanger or said inlet of said fluid motor; a second valve means for selectively connecting said outer chamber with said second heat exchanger or said inlet of said fluid motor; third and fourth passage means connecting said outlet of said fluid motor with said first and second heat exchangers; and a third valve means for selectively connecting said outlet of said fluid motor with either said first heat exchanger or said second heat exchanger.

6. The apparatus defined in claim 3 that includes a thermally responsive control means for actuating said valve means.

7. The apparatus defined in claim 4 that includes a thermally responsive control means for actuating said valve means.

8. The apparatus defined in claim 5 that includes a thermally responsive control means for actuating said valve means.

9. A heat engine comprising, in combination, a flexible thermally expandable and contractable shell forming an inner chamber; a housing in spaced surrounding relationship with said shell and forming therewith an outer chamber; a first heat exchanger and fluid translating means including inner inlet and outlet conduits for said inner chamber; a second heat exchanger and fluid translating means including outer inlet and outlet conduits for said outer chamber; a fluid motor; and conduit means connecting said chambers with said motor.

10. A heat engine comprising, in combination, a flexible thermally expandable and contractable shell forming an inner chamber; a housing in spaced surrounding relationship with said shell and forming therewith an outer chamber; a first heat exchanger and fluid translating means including inner inlet and outlet conduits for said inner chamber; a second heat exchanger and fluid translating means including outer inlet and outlet conduits for said outer chamber; a fluid motor; a first passage means between said inner chamber and said motor; a second passage means between said outer chamber and said motor; and valve means for alternately connecting and disconnecting said passage means with said motor.

References Cited in the file of this patent
UNITED STATES PATENTS
2,362,271    Heymann _____ Nov. 7, 1944